(12) United States Patent
Fischbach

(10) Patent No.: US 6,948,925 B2
(45) Date of Patent: *Sep. 27, 2005

(54) CLOSING DEVICE IN AN INJECTION MOULDING MACHINE FOR PLASTICS

(75) Inventor: Gunther Fischbach, Fürstenfeldbruck (DE)

(73) Assignee: Mannesmann Plastics Machinery GmbH, München (DE)

( * ) Notice: Subject to any disclaimer, the term of this patent is extended or adjusted under 35 U.S.C. 154(b) by 36 days.

This patent is subject to a terminal disclaimer.

(21) Appl. No.: 10/470,834

(22) PCT Filed: Feb. 15, 2002

(86) PCT No.: PCT/EP02/01616

§ 371 (c)(1),
(2), (4) Date: Jul. 30, 2003

(87) PCT Pub. No.: WO02/064346

PCT Pub. Date: Aug. 22, 2002

(65) Prior Publication Data

US 2004/0062831 A1 Apr. 1, 2004

(30) Foreign Application Priority Data

Feb. 15, 2001 (DE) .......................... 101 07 502
Jun. 28, 2001 (DE) .......................... 101 30 669
Oct. 19, 2001 (DE) .......................... 101 52 688

(51) Int. Cl.$^7$ ............................................ B29C 45/66
(52) U.S. Cl. ................................. 425/593; 425/451.6
(58) Field of Search .............................. 425/593, 451.6

(56) References Cited

U.S. PATENT DOCUMENTS

| | | | | |
|---|---|---|---|---|
| 5,585,126 A | * | 12/1996 | Heindl et al. | ............... 425/593 |
| 5,804,224 A | | 9/1998 | Inaba et al. | |
| 6,413,453 B1 | * | 7/2002 | Onishi | ......................... 425/593 |
| 6,682,334 B2 | * | 1/2004 | Becker et al. | ............... 425/593 |

FOREIGN PATENT DOCUMENTS

| | | | |
|---|---|---|---|
| EP | 0 620 095 A2 | | 10/1994 |
| JP | 8-174612 | * | 7/1996 |
| WO | WO 01/47685 | | 7/2001 |

* cited by examiner

Primary Examiner—James P. Mackey
(74) Attorney, Agent, or Firm—Henry M. Feiereisen

(57) ABSTRACT

The invention relates to a clamping device for an injection molding machine for plastics, including a fixed platen (11) which is connected to a moving platen (12) by means of a toggle mechanism (13). A hollow-shaft motor (7) is provided to cooperate with a spindle (21) for operating the toggle mechanism, wherein the hollow-shaft motor (7) is connected to the toggle mechanism (13). According to the invention, the spindle (21) is arranged in a rotationally fixed manner, the end of the spindle (21), facing the moving platen (12), is in engagement with the rotor (6) of the hollow-shaft motor (7), and the stator (4) of the hollow-shaft motor is connected with the toggle mechanism (13). Preferably, a spindle nut is fixed in the rotor (6) for engagement with the spindle (21), preferably in the form of a recirculating ball screw.

10 Claims, 2 Drawing Sheets

CLOSING DEVICE IN AN INJECTION MOULDING MACHINE FOR PLASTICS

BACKGROUND OF THE INVENTION

The invention relates to a clamping device for an injection molding machine for plastics.

EP 0658 136 B1 discloses a clamping unit for molding tools of injection molding machines, including a clamping system in the form of a toggle mechanism, disposed between the moving platen and an end platen, for displacing the moving platen. Several so-called five-point toggle lever systems are coupled with a common crosshead. A threaded spindle is connected in fixed rotative engagement upon the crosshead and engages a nut which is immobile in axial direction but received in the end platen for rotation. The rotary drive is implemented by coupling the nut to a hollow shaft of an electric motor which is flange-mounted to the outside of the end platen. The hollow shaft is internally so dimensioned as to be suitable to easily receive the entire length of the threaded spindle, when the threaded spindle extends rearwards out of the nut. The toggle lever systems are in symmetric relationship to the force axis of the clamping unit, and the threaded spindle, the spindle nut and the electric motor with its hollow shaft are in alignment with the force axis of the clamping unit. A similar system is described in DE-PS 195 24 314 C1.

These systems have shortcomings relating to a comparably long construction of the clamping device because the electric motor is arranged outside the end platen and the inner dimension of the hollow shaft is suited to the spindle length.

Generic U.S. Pat. No. 5,804,224 discloses (see FIG. 1) the securement of the hollow-shaft motor to the crosshead of the toggle type clamping unit and to drive with the rotor a spindle which is in engagement with a spindle nut that is non-rotatably fixed on the backside of the end platen. As the rotor is rotated, the spindle is caused to rotate and the unit of spindle and hollow-shaft motor is moved axially to the rear and the front, as a consequence of the engagement with the fixed spindle nut, so that the toggle mechanism is operated. This embodiment has also the drawback that the clamping device demands a relative large space because the spindle juts out considerably from the backside of the end platen, when the clamping unit is open.

SUMMARY OF THE INVENTION

The invention is based on the object to provide a clamping device of this type, which has a significantly shorter length while still allowing a cost-efficient construction.

This object is realized in accordance with the invention by the features of claim 1. The subsequent claims are advantageous improvements of the invention.

This object is realized a clamping device for an injection molding machine for plastics, which includes a fixed platen, which is connected via a toggle mechanism with a moving platen, wherein a hollow-shaft motor interacts with a spindle for operating the toggle mechanism, and wherein the hollow-shaft motor is connected with the toggle mechanism, wherein the spindle is arranged in rotationally fixed manner, that the end of the spindle, facing the moving platen, is in engagement with the rotor of the hollow-shaft motor, and that the stator of the hollow-shaft motor is connected with the toggle mechanism.

DETAILED DESCRIPTION OF PREFERRED EMBODIMENTS

Figure 1:
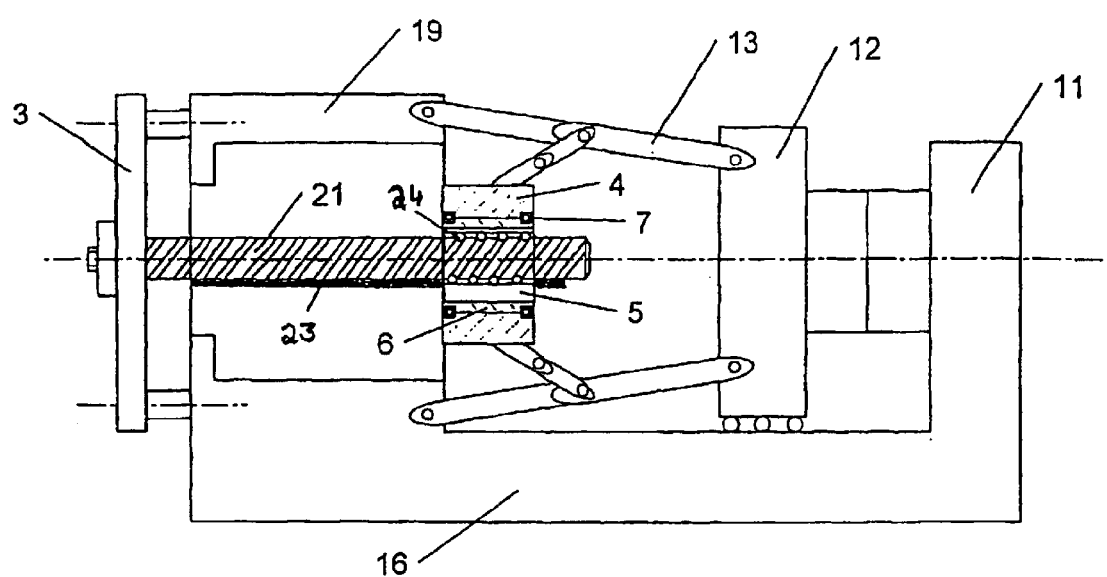
FIG. 1 shows a cross section of a clamping device according to the invention.
Figure 1A:
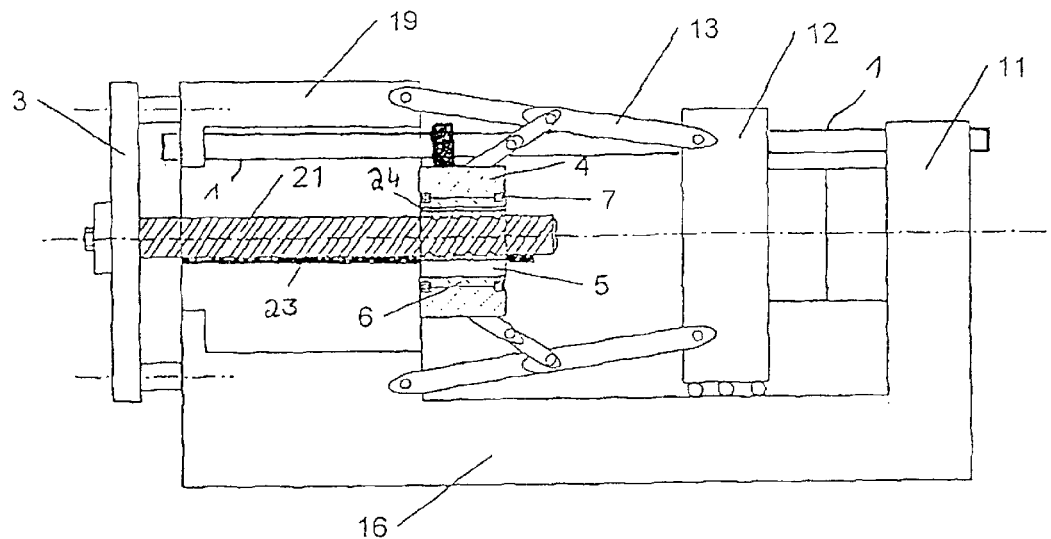
FIG. 1a shows a cross section of a modified clamping device according to the invention.
Figure 1B:
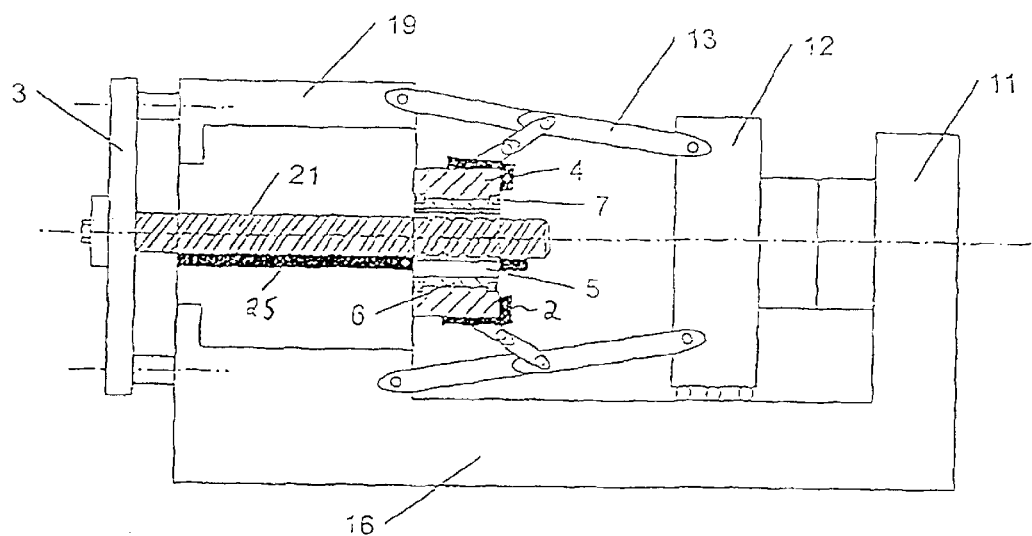
FIG. 1b shows a cross section of another modified clamping device according to the invention.

An example of the invention is illustrated in the attached FIG. 1. Arranged on a machine bed 16 is a fixed platen 11, whereby a moveable platen 12 is able to move axially relative to the fixed platen by a toggle mechanism 13. The moving platen 12 is movably guided on several tie bars 1, as shown in FIG. 1a (only one is shown here), which extend in a manner known per se between the fixed platen and an end plate 19, whereby the fixed platen 11 is connected via the machine bed 16 with the end platen 19. A spindle 21 is guided with its end distal to the moving platen through the end platen 19 and connected in a rotationally fixed manner in an anchor plate 3. Flange-mounted to the toggle mechanism 13 on the other end of the spindle 21 is a hollow-shaft motor 7. A spindle nut 5 is coupled with the hollow shaft or the rotor 6 of the hollow-shaft motor and is in engagement with the spindle 21. In the presently illustrated example, the stator 4 of the hollow-shaft motor is flange-mounted directly to the toggle mechanism 13. As an alternative, at least one of tie bars 1 may serve as support for the hollow-shaft motor 7 or, as shown in FIG. 1a, as support of the stator 4. The hollow-shaft motor 7 may also be received in its entirety by a crosshead 2 of the toggle mechanism, when the latter has a recess suited to the hollow-shaft motor, as shown by way of example in FIG. 1b. In this way, the functions of the crosshead and those of the drive motor are united.

Optionally, in particular when heavy hollow-shaft motors are involved, it is advantageous to provide carrier arms 23 laterally and/or underneath the hollow-shaft motor for movable support of the hollow-shaft motor 7. In this way, the spindle 21 and the joints of the toggle mechanism are relieved. The carrier arms 23 may be secured in the end platen 19 or extend through the end platen and fixed in the anchor plate 3 situated therebehind. In FIG. 1, only the rear one of the two lateral carrier arms 23 is partially visible.

What is claimed is:

1. A clamping device for an injection molding machine for plastics, comprising a fixed paten; a toggle mechanism for connecting the fixed platen with a moving platen; and a hollow-shaft motor interacting with a spindle for operating the toggle mechanism, with the hollow-shaft motor connected with the toggle mechanism, wherein the spindle is arranged in rotationally fixed manner and has an end which faces the moving platen and is in engagement with a rotor of the hollow-shaft motor, whereby a stator of the hollow-shaft motor is connected with the toggle mechanism.

2. The clamping device of claim 1, wherein the rotor has an internal thread which meshes with a thread of the spindle.

3. The clamping device of claim 1, wherein a spindle nut is secured in the rotor for engagement with the spindle.

4. The clamping device of claim 1, wherein the toggle mechanism is coupled to a crosshead, with the hollow-shaft motor being flange-mounted to the crosshead.

5. The clamping device of claim 1, wherein the toggle mechanism is coupled to a crosshead, said crosshead having a recess for receiving the hollow-shaft motor.

6. The clamping device of claim 1, wherein the toggle mechanism is coupled directly to the stator of the hollow-shaft motor.

7. The clamping device of claim 1, wherein the moving platen is movably guided on several tie bars, wherein at least one of the tie bars serves at the same time as carrier arm for support of the hollow-shaft motor or the stator of the hollow-shaft motor.

8. The clamping device of claim 1 wherein the spindle is guided through the fixed platen and secured in a rotationally fixed manner in an anchor plate.

9. The clamping device of claim 2, wherein the internal thread of the rotor meshes with the thread of the spindle via balls.

10. The clamping device of claim 3, wherein the spindle nut is secured in the rotor for engagement with the spindle via balls.

* * * * *

UNITED STATES PATENT AND TRADEMARK OFFICE
CERTIFICATE OF CORRECTION

PATENT NO. : 6,948,925 B2
DATED : September 27, 2005
INVENTOR(S) : Gunther Fischbach It is certified that error appears in the above-identified patent and that said Letters Patent is hereby corrected as shown below:

<u>Title page,</u>
Item [54], Title, should read -- CLAMPING DEVICE IN AN INJECTION MOLDING MACHINE FOR PLASTICS --.

Signed and Sealed this

Seventh Day of March, 2006

JON W. DUDAS
*Director of the United States Patent and Trademark Office*